United States Patent [19]

Wakabayashi

[11] 3,729,202

[45] Apr. 24, 1973

[54] CASSETTE TAPE RECORDER

[76] Inventor: Rinske Wakabayashi, Rm. 1102, 2-257, Nishi-Ohkubo, Tokyo, Japan

[22] Filed: July 13, 1970

[21] Appl. No.: 54,338

[30] Foreign Application Priority Data

July 12, 1969 Japan ................................44/54992

[52] U.S. Cl. ....................274/4 D, 242/198, 242/201, 242/208, 274/4 E

[51] Int. Cl. .........................G11b 15/32, G11b 23/04

[58] Field of Search .......................274/4 C, 4 D, 4 E, 274/4 F, 4 G, 11 C, 11 D; 242/198, 201, 202, 208, 209; 179/100.2 Z

[56] References Cited

UNITED STATES PATENTS

| | | | |
|---|---|---|---|
| 3,531,575 | 9/1970 | Kobler | 274/4 C |
| 3,495,835 | 2/1970 | Laa | 274/4 E |
| 3,603,595 | 9/1971 | Wada | 274/4 E |
| 3,394,898 | 7/1968 | Laa | 274/4 E |

FOREIGN PATENTS OR APPLICATIONS

| | | | |
|---|---|---|---|
| 32,265 | 12/1969 | Japan | 274/4 E |

*Primary Examiner*—Leonard Forman
*Assistant Examiner*—Dennis A. Dearing
*Attorney*—Kemon, Palmer & Estabrook

[57] ABSTRACT

A cassette tape recorder, wherein, when a cassette is placed on a deck, a main lever carrying magnetic heads, a pinch roller and the other required members are released to move toward the cassette, so that the magnetic heads engage the stretched portion of a magnetic tape and the pinch roller pinches the tape with a capstan shaft to drive the tape by the rotation of the capstan shaft.

3 Claims, 13 Drawing Figures

Patented April 24, 1973 3,729,202

4 Sheets-Sheet 1

INVENTOR.

BY Rinske Wakabayashi attys. Kemon, Palmer & Estabrook

INVENTOR.
Rinske Wakabayashi
BY
Kemon, Palmer & Estabrook
attys.

INVENTOR.
BY Rinske Nakabayashi

Kemon, Palmer + Estabrook
attys.

INVENTOR.
Rinski Wakabayashi
BY
Kemon, Palmer & Estabrook
attys.

CASSETTE TAPE RECORDER

This invention relates to a cassette tape recorder and more particularly to a cassette tape recorder wherein a tape cassette may be set in the recording and reproducing state simply by being placed in a predetermined position in said recorder.

In the conventional cassette tape recorder, the recording and reproducing operation could not be started by a single step of placing a cassette in position in the recorder, but there was required the troublesome manipulation of push buttons or levers for inserting magnetic heads and pinch roller to start the recording and playback after the insertion of the cassette.

Although there have been proposed cassette tape recorders of the type capable of starting the recording and playback simply by placing the cassette in position, they were extremely complicated in construction and very likely to be accompanied with troubles. Besides, the manufacture of such recorders was very difficult, resulting in a very high production cost. With such recorders, the erasing accident preventing means provided in the cassette could not be fully operative.

An object of the present invention is to provide a cassette tape recorder, which is of simple construction and capable of starting the recording and playback by a single step of placing the cassette in position in the recorder, thus eliminating the above disadvantages as well as offering other advantages.

According to the present invention, there is provided a cassette tape recorder, wherein the loading of a tape cassette into the recorder releases a main lever carrying various operational elements such as magnetic heads and a pinch roller into an operative position.

The features and advantages of the present invention will now be described in conjunction with a preferred embodiment thereof with reference to the accompanying drawings, in which.

Figure 2:
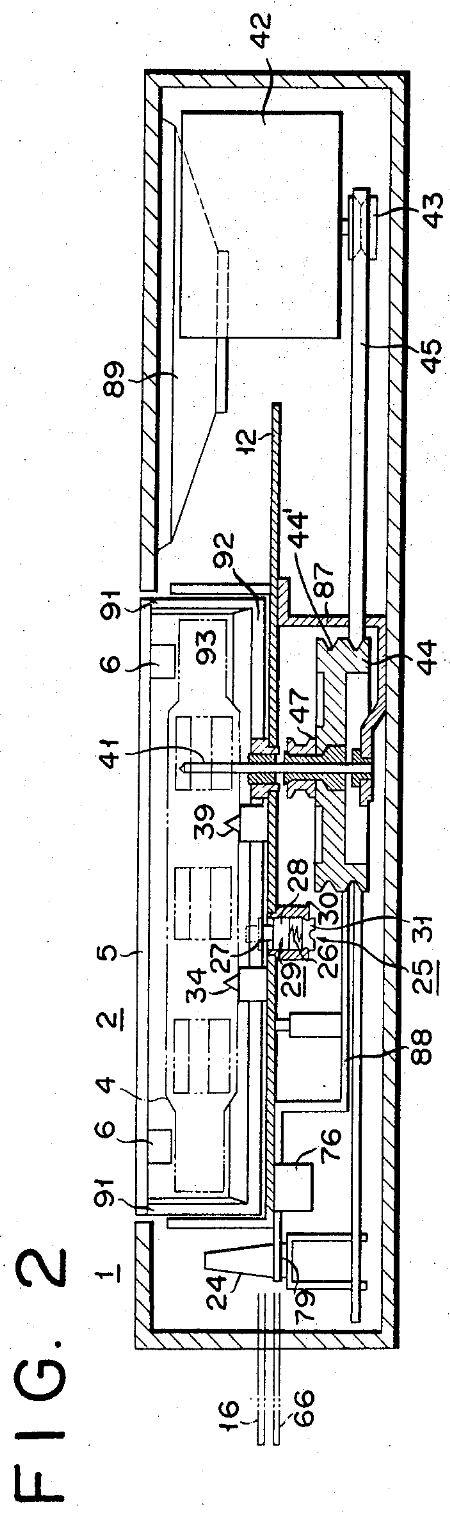
FIG. 2 is a sectional view taken along line II—II of FIG. 1.
Figure 3:
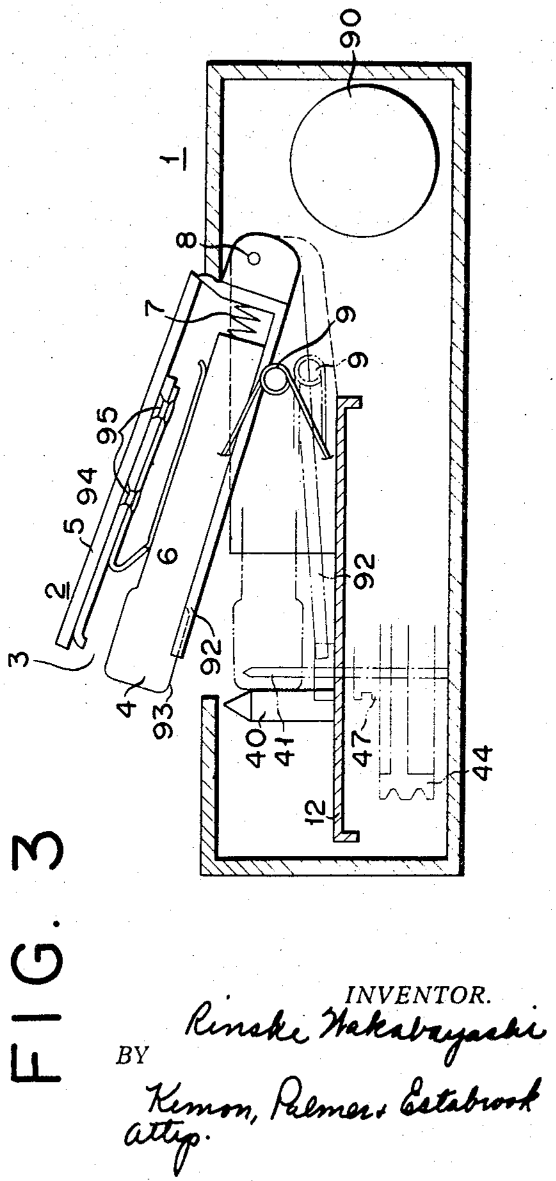
FIG. 3 is a sectional view taken along line III—III of FIG. 1.
Figure 6:
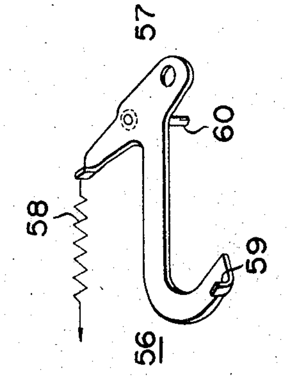
FIGS. 5 to 11 are exploded perspective views illustrating various parts of the embodiment of FIG. 1.
Figure 4:
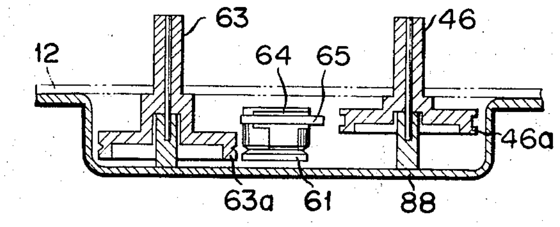
FIG. 4 is a sectional view taken along line IV—IV of FIG. 1.
Figure 5:
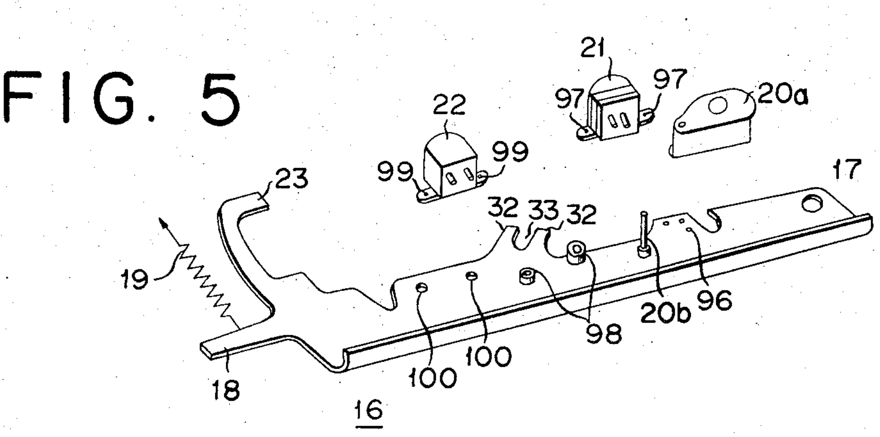
Figure 7:
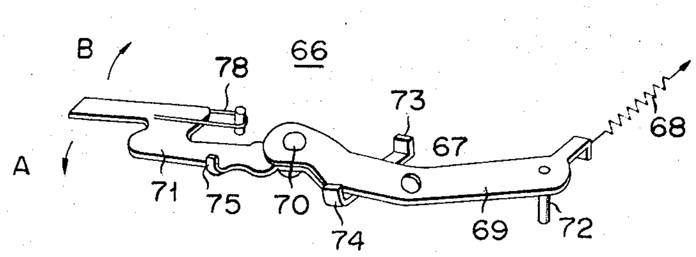

Referring now to the drawings, a cassette tape recorder embodying the present invention comprises a casing 1 made of synthetic resin or light metal, which has a prescribed space to hold a cassette receiving box as generally designed at 2 in FIG. 2. Said cassette receiving box 2 can be dispensed with and, if necessary, a tape cassette 4 may be directly inserted into said space. In this embodiment, said cassette receiving box 2 has side walls 91 and a front opening 3 wider than the thickness of said cassette 4 as shown in FIG. 3.

Said cassette receiving box 2 has a cross section of a U-shape horizontally positioned and a thickness gently tapered toward the rear end. Said cassette receiving box 2 has a bottom plate 92 partly cut away to form a window (not shown) through which the middle portion of the undersurface 93 of the cassette 4 set in said box 2 is exposed to the outside. Said cassette receiving box 2 further has a top plate 5 provided with two spring members 6 folded substantially in a U-shape and secured to the underside thereof by means of rivets 95 in such a manner that the folded portion of said spring member 6 faces the opening 3 and the free leg of said spring member 6 pushes down the cassette to the bottom plate 92. The cassette receiving box 2 is provided with a cushion spring 7 for pushing the rear end of the cassette 4 toward the opening 3, and coaxial pivots 8 mounted on the rear portions of both side walls thereof and journaled to the frame of said casing 1, so that the cassette receiving box 2 is swingable about the axis of said pivots 8 to be inserted into the aforesaid prescribed space in the casing 1 and removed from it, with the front portion of said box 2 moved up and down. There is provided a coiled torsion spring member 9 positioned in said prescribed space and urging the cassette receiving box 2 upwards.

To the frame 12 of said casing 1 is pivotally secured a bellcrank-shaped lock lever 10 by means of a pin 13. Said lock lever 10 has a claw 11 engageable with the side edge of said cassette receiving box 2 when it is completely set in the aforesaid prescribed space. To the free end of said lock lever 10 is attached an operable pin 15 for disengaging the claw 11 from the side edge of said box 2. A coiled tension spring member 14 is stretched between the other end of said lock lever 10 and the frame 12 so as to urge the claw 11 toward the side edge of said box 2.

The cassette tape recorder comprises a main lever 16 one end of which is pivotally secured to the frame 12 by means of a pin 17 and the other end of which protrudes outside of the casing so as to be formed into a manually operable handle bar 18. Said main lever 16 is positioned in front of the prescribed space and urged toward the cassette or the cassette receiving box set in said space by means of a tension spring member 19. The tension spring member 19 may be replaced by a compression spring member for the same operation. The main lever carries a pinch roller 20, a recording and reproducing head 21 and an erasing head 22. The pinch roller 20 is pivotally secured to a channel-shaped plate 20*a* rotatably attached to a pin 20*b* vertically protruding from the upper portion of the frame 12, and is urged toward the cassette receiving box 2 set in the aforementioned prescribed space, by means of a spring (not shown). The recording and reproducing head 21 is mounted on said main lever 16 with leg plates 97 of the head 21 attached to protuberances 98. Similarly, the erasing head 22 is mounted on said main lever 16 with the leg plates 99 of the head 22 attached to protuberances 100.

Figure 1:
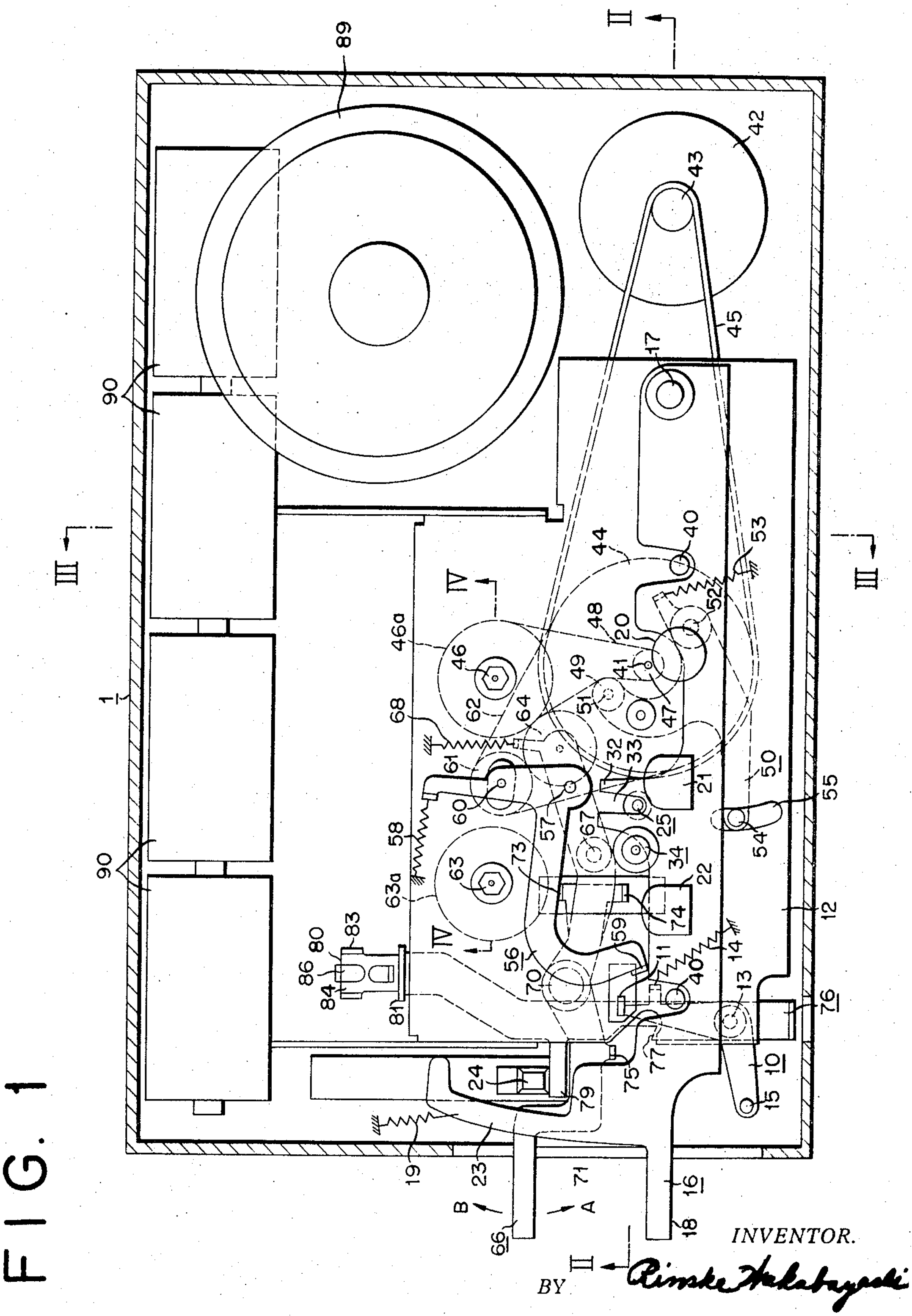
FIG. 1 is a plan view of a cassette tape recorder embodying this invention, wherein a cassette casing is partly removed to illustrate the details of the mechanism involved.
Figure 11:
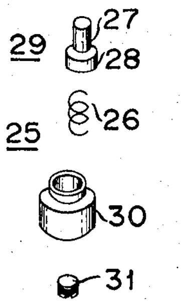

In order to allow the displacement of the main lever in the setting of the cassette or the cassette receiving box in the prescribed space, a control means 25 (as shown in FIGS. 1, 2 and 11) is disposed on the frame 12 within said prescribed space.

Said control means 25 comprises a stepped pin member 29 having a lower large-diameter portion 28 and an upper small-diameter portion 27 coaxially formed on said lower portion 28, a hollow cylindrical member 30 in which the lower portion 28 is slidably contained and the bottom of which is threaded for fitting a stop screw 31 thereinto, and a spring 26 for urging the pin member 29 upwards which is disposed between the bottom of the lower portion 28 and the top of the stop screw 31. The control means 25 further involves a forked portion 32 formed on the rear side of the main lever 16. Said forked portion 32 has a slit 33 formed in the middle portion thereof. Said slit 33 has a width smaller than the diameter of the lower portion 28 and larger than the diameter of the upper portion 27.

Figure 13:
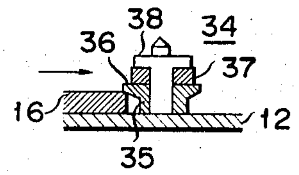
FIG. 13 is a sectional view illustrating part of the recorder of FIG. 1.

Accordingly, before the cassette receiving box 2 is set in the prescribed space of the casing 1, the top of the lower portion 28 engages the rearward top of said forked portion 32 to prevent the main lever from being displaced toward the cassette setting position against the bias of the spring 19, while the setting of the cassette receiving box 2 causes the top of the pin member 29 to be pushed down by the lower side thereof so that the lower portion 28 is disengaged from the forked portion 32 and withdrawn into a hollow cylinder 30, thereby causing the main lever 16 to be displaced into a set position with the upper portion 27 introduced into the slit 33. On the frame 12 are mounted cassette supporting pins 34 and 39. The cassette supporting pin 34 prevents the main lever from being further moved toward the prescribed cassette, and has a tapered flange member 35 made of elastic synthetic resin, for example, polyoxymethylene so that said flange member 35 supports the main lever by detachably wedging the rear edge of said main lever into a space defined by the flange 36 of said member 35 with the upper surface of the frame 12. A member 37 illustrated in FIG. 13 is an elastic washer disposed between the upper flanged portion of the cassette supporting pin 34 and the tapered flange member 35 so as to urge the latter member 35 downward.

Cassette guiding poles 40 are disposed on the frame 12 so as to prevent the main lever from being moved over the recording and reproducing position toward the cassette, and guide the cassette receiving box 2 and the cassette 4 to the predetermined position for recording and reproducing.

A capstan shaft 41 is rotatably disposed in the aforesaid prescribed space and driven by a motor 42 through a transmitting means consisting of a wheel 44 coaxially attached to the capstan shaft 41, a wheel 43 attached to the power take-off shaft of the motor 42, and an endless belt 45 stretched between the wheels 44 and 43. Said capstan shaft 41 cooperates with the pinch roller 20 in the displacement of the main lever 16 to the set position so that the portion of a magnetic tape stretched between a pair of tape reels disposed in the tape cassette 4 may be depressed to the periphery of the capstan shaft 41 when urged by the pinch roller toward said shaft 41.

A pair of rotating members 46 and 63 are rotatably disposed on the prescribed space with their members vertically extending through the frame 12. One rotating member 46 is adapted to rotate the reel so that the magnetic tape is wound about said reel at least in recording and reproducing, while the other rotating member 63 rotates the other reel so that magnetic tape is rewound about said reel in rewinding.

The cassette tape recorder further comprises means alternately brought into engagement with said rotating members 46 and 63 so as to transmit power for rotating said reels in opposite directions.

Said power transmitting means comprises a first device for transmitting power to the forward rotating member 46 while said main lever 16 is displaced toward said cassette side, and a second device engaged with the reverse rotating member 63 when said main lever is retreated from said cassette, thereby to transmit power to said reverse rotating member or rotor 63, and also disengaged from said reverse rotating member 63 when said main lever is displaced to the cassette side.

Said first power transmitting device involves a first rockable lever 50 pivoted by means of a pin 52 and movable according to the displacement of the main lever 16 by the bias of a spring 53 stretched between the right side end of said rockable lever and the frame. Said rockable lever 50 carries a tensioning roller 49 pivoted to a rearwardly protruding portion thereof, by means of a pin 51, and a guide pin 54 attached to the other end thereof which is depressed to the forward edge of the main lever 16.

Said second power transmitting device involves a second rockable lever 56 of a crooked shape carrying a friction roller 61 and pivoted by means of a pin 57. Said rockable lever 56 is urged anticlockwise by means of a tension spring 58 stretched between the rear end thereof and the frame 12. A protrusion 59 is formed at the forward end of said rockable lever 56 so as to be depressed to the rear edge of the main lever 16 by the bias of the spring 58. Accordingly, the friction roller 61 is, by the bias of the spring 58, engaged with a wheel 63*a* coaxially attached to the reverse rotating member 63 when the displacement of the main lever 16 is prevented by the control means 25 or manual operation, and is disengaged from the wheel 63*a* in the displacement of the main lever 16 toward the set cassette. Between the friction roller 61 and a pulley 44′ on the capstan shaft 41 is stretched an endless belt 62 of fabric so as to transmit power to the reverse rotating member 63 when the friction roller 61 contacts the wheel 63*a*.

The cassette tape recorder further comprises a third power transmitting device 66 engageable with the second power transmitting device and the forward rotating member 46 so as to transmit power from the former to the latter by overcoming the power supplied by the power transmitting device when said second power transmitting device 56 is disengaged from the reverse rotating member 63.

Said third power transmitting device comprises a transmitting roller 64 engageable with the wheel 46*a* of the forward rotor 46 and the friction roller 61 so as to transmit the power of said friction roller 61 to said wheel 46*a* when the friction roller is disengaged from the wheel 63*a* of the reverse rotating member 63, and a fast-feed rockable lever 69 having a pivot 72 rotatably carrying said roller 64.

Said rockable lever 69 is pivoted by means of a pin 67, and urged anticlockwise, as shown in FIG. 1, by means of a tension spring 68 stretched between the right end thereof and the frame 12. The left end of said rockable lever 69 is pivotally secured to a manually operable member 71 by means of a pin 70. The manual handle portion of said member 71 projects outside of the casing 1. The member 71 involves a pair of engaging protuberances 73 and 74 mutually spaced across the length of the lever 69 and positioned more to the right than the pin 70, and a claw 75 attachable upon depression to the rear edge of the main lever and engageable with the cut edge 77 of a recording set member 76 described hereinafter.

Figure 8:
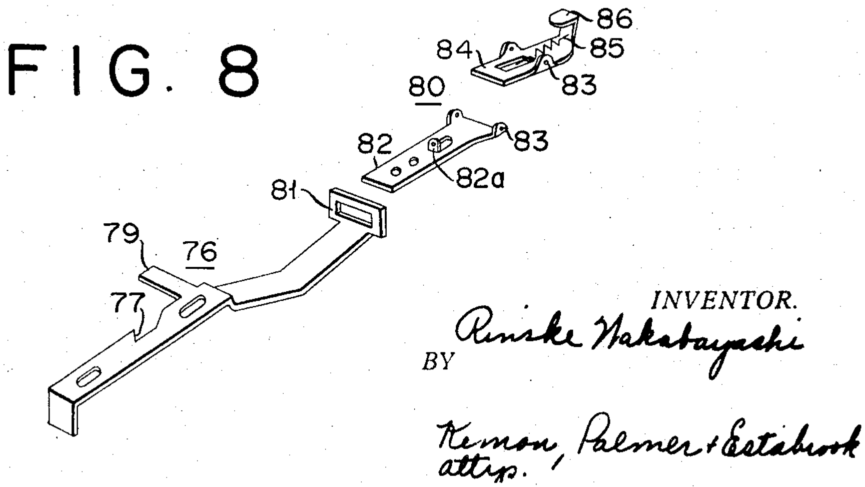
Figure 9:
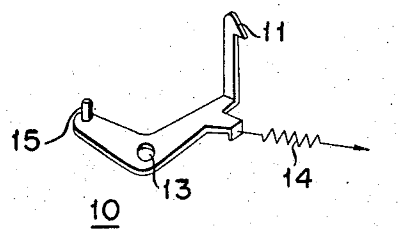
Figure 10:
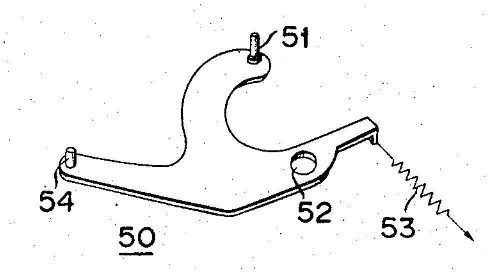

Said recording set member or lever 76 (as shown in FIGS. 1 and 8) is slidably attached to the casing 1 with its length extending from the rear side to the forward side of said casing 1. Said recording set lever 76 has a cross bar 79 projecting from the side thereof and a gate portion 81 formed at the rear end thereof. Said cross bar 79 is positioned so as to face the switching device 24 for recording in a lengthwise direction of said recording set lever 76. Said recording set lever 76 supports an erasing accident preventing means 80 (FIGS. 1 and 8) by inserting a stud base member 82 involved in said preventing means 80 through said gate portion 81. Said preventing means 80 further involves a stud member 84 pivotally attached to the stud base member 82 at 83 and having an engaging claw 86 integrally formed with the rear end thereof.

A coiled tension spring is stretched between the claw 86 and the tab 82a of the stud base member 82 to be urged in its forward direction, so as to cause the forward end of the stud member 84 to abut on the upper edge portion of said gate portion 81. The rear wall of the cassette 4 contacts the claw 86 and rearwardly urges it so as to cause the stud member 84 to rotate about its pivot 83, thereby escaping the forward end of the stud member 84 from the abutment of said gate portion 81. Accordingly, the upper edge portion of said gate portion 81 is capable of being inserted into a space defined between the forward portion of said stud member 84 and the upper side of the stud base member 82.

Under this condition, the recording set lever can be rearwardly moved so as to cause the cross bar 79 to push upon depression the operating member of the switching device 24 for recording. If, in this case, the portion of the rear wall of the cassette facing the claw 86 is cut away, the recording set lever 76 can not be moved, because the forward end portion of the stud member 84 is kept abutted on the upper edge of the gate portion 81 when the rear cassette wall does not apply a load on the claw 86.

In this arrangement, numerals 87 and 88 designate supporting frame members carrying the capstan shaft 41 and the rotating members 46 and 63, numeral 89 a speaker and numeral 90 a battery source.

Figure 12:
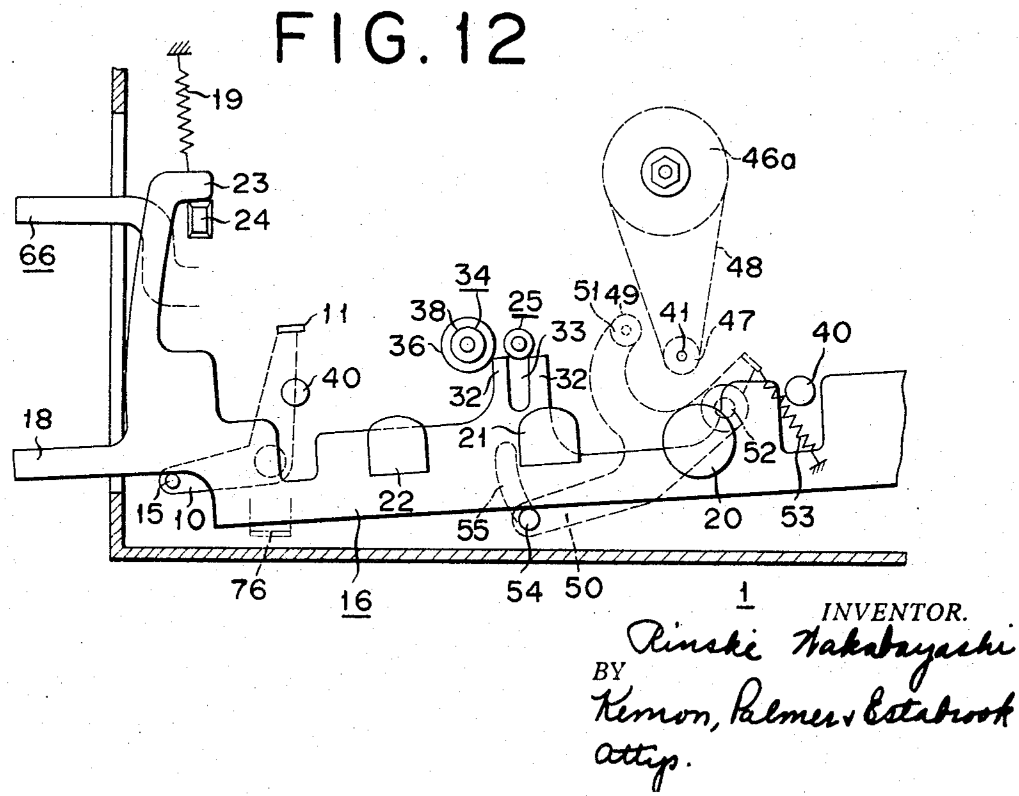
FIG. 12 is a fragmentary plan view illustrating the inoperative state of the recorder of FIG. 1.

When the cassette receiving box 2 is not set in the aforesaid prescribed space in the casing 1, the main lever 16 maintains a position shown in FIG. 12.

for reproducing or playback, the cassette 4 is inserted against the force of the spring members 6 into the cassette receiving box 2, as shown in FIG. 3. And the cassette receiving box 2 carrying said inserted cassette 4 is placed in an operative position within said prescribed space with the forward edge of the cassette 4 guided by the cassette supporting pins 34 and 39. Slightly before the cassette receiving box 2 comes to a set position, the tape reels of said cassette 4 engage the rotating members 46 and 63, and the capstan shaft 41 is inserted into the cassette 4.

When the cassette receiving box 2 reaches the set position, the box 2 is locked by the lock lever 10, and the undersurface 93 of the cassette 4 pushes down the stepped pin member 29 to release the engagement of the large-diameter portion 28 with the tips of the legs 32 permitting the displacement of the main lever 16 toward the cassette 4.

As a result, the pinch roller 20, the recording and reproducing head 21 and the erasing head 22 are set in the cassette 4, in such a manner that the pinch roller 20 pinches the tape with the capstan shaft 41, and the recording and reproducing head 21 and the erasing head 22 are brought into contact with the tape. With the movement of said main lever 16, the rockable lever 50 is turned by the force of the tension spring 53, so that the tensioning roller 49 exerts pressure on the endless belt 48 tightly to stretch it between the pulleys 46a and 47, thereby causing the forward rotating member 46 to be rotated in the take-up direction. The tape is driven at a constant speed by the capstan shaft 41, pinch roller 20 and forward rotating member or take-up rotor 46 to effect the playback.

At this time, the re-winding rotor 63 is separated from the friction roller 61 since the rockable lever 56 is turned clockwise as shown in FIG. 1 by the protrusion 59 urged by the rear edge of the main lever 16 against the bias of the spring 58.

When the recording set member 76 is pushed at the forward top thereof by the fingers to start recording the cross bar 79 actuates the change-over switch 24 to set up a circuit for the recording. In this case, the tape is driven in the same manner as is in the case of reproducing to effect the recording.

To stop the recording process, the main lever 16 is forwardly returned to actuate the change-over switch 24 by the hook 23 of said main lever 16 into a position for the playback and cause the pinch roller 20, the recording and reproducing head 21 and the erasing head 22 to be withdrawn from their operating positions.

The further returning motion of the main lever 16 causes the forward edge thereof to engage the pin 15 so that the locking claw 11 is disengaged from the side edge of the cassette receiving box 2 upon the rotation of the lock lever 10 about its pivot 13, whereby the box 2 is turned upward by the bias of the spring 9 to be removed from the prescribed space.

For the fast-feed, the third power transmitting device 66 is operated. At this time the claw 75 is depressed to the rear edge of the main lever 16 by pulling the manual operable member 71 forwards, and engages the cut edge 77 of the recording set member 76 so as to return the member 76 forwards if said member 76 is set in the recording position. With the operation of the member 71, the protuberance 73 engages the lever 56 to disengage the roller 61 from the reverse rotor 63, while the protrusion 59 is released from engagement with the rear edge of the main lever 16 by the forward displacement of said lever 16.

Accordingly, the rotation of the roller 61 is transmitted through the roller 64 to the wheel 46a. At this time, the pin 54 is forwardly pushed by the returning motion of the main lever 16, so that the pinch roller 49 is retracted from the endless belt 48 upon the rocking of the lever 50 about its pivot 52, causing the power transmission through the first transmitting device to be cut off, whereby the rotating member 46 is driven at a high speed due to the rotation of the second power transmitting device by the medium of the third power transmitting device.

At the instant the operation is stopped, the rollers 61 and 64 are disengaged from each other and engaged with the wheels 46*a* and 63*a* respectively and then the tape is stretched taut.

It is possible, if necessary, to incorporate a cassette tape recorder of the aforesaid arrangement in a radio set and the like.

What is claimed is:

1. A cassette tape recorder comprising:

a recorder casing having a frame and a space for receiving a tape cassette;

a forward and a reverse rotating member carried by said frame and disposed in said space coaxially with the axes of a pair of reels rotatably disposed in said cassette so as to cause a cassette tape to be displaced from one reel to the other reel, said forward rotating member being operated at least in recording and reproducing and said reverse rotating member being operated in rewinding the cassette tape;

a main lever carried by said frame and displaceable toward the cassette;

means for causing said lever to be released in the setting of said cassette in said space and returned to its initial position upon the removal of the cassette from said space;

magnetic heads attached to said lever and positioned to face that portion of the cassette tape stretched between said reels through windows formed on a side of said cassette;

means for urging said lever toward said cassette in a manner to cause said lever to be so displaced, when released, as to cause said magnetic heads to engage the stretched portion of said cassette tape;

a capstan shaft carried by said frame;

a pinch roller attached to said lever for depressing the stretched portion of said cassette tape toward the periphery of said capstan shaft upon the displacement of said lever;

power transmitting means for driving said forward and reverse rotating members comprising a first device carried by said frame for transmitting power to said forward rotating member when said lever is displaced toward said cassette and a second device carried by said frame for transmitting power to said reverse rotating member, said second device being inoperative upon the movement of said lever toward said cassette and becoming operative for transmitting power to said reverse rotating member when said lever is displaced from said cassette;

said first power transmitting device including a rockable lever carried by said frame and movable according to the displacement of said lever, a wheel carried by said forward rotating member, a wheel carried by said capstan shaft, a belt entrained about said wheels and a tensioning roller carried by said rockable lever and engaging said belt, and said second power transmitting device includes a second rockable lever carrying a friction roller, a wheel carried by said reverse rotating member, a second wheel carried by said capstan shaft, a belt entrained about said second wheel and said friction roller, a spring connected to said frame and said second rockable lever for moving said friction roller into engagement with said wheel on said reverse rotating member, said second rockable lever engaging said lever to cause said friction roller to be disengaged from said wheel on said reverse rotating member against the force of said spring upon the movement of said lever toward said cassette.

2. A cassette tape recorder as set forth in claim 1 wherein said power transmitting means embodies a third device, said third device includes a third lever carried by said frame and having a roller engageable with said wheel of said forward rotating member and said friction roller on said second rockable lever, said roller transmitting the drive of said friction roller to said wheel of said forward rotating member upon the disengagement of said friction roller from said wheel of said reverse rotating member.

3. A cassette tape recorder as set forth in claim 2 wherein the lever of said third power transmitting device is rockably mounted on said frame and a spring engages one end of said lever with said frame for urging said transmitting roller into engagement with the wheel of said forward rotating member.

* * * * *